US009855657B2

(12) United States Patent
McCrackin et al.

(10) Patent No.: US 9,855,657 B2
(45) Date of Patent: Jan. 2, 2018

(54) SYNTACTIC INFERENTIAL MOTION PLANNING METHOD FOR ROBOTIC SYSTEMS

(75) Inventors: Daniel Curtis McCrackin, Hamilton (CA); Stephen Wayne Johnson, Waterdown (CA)

(73) Assignee: Thermo CRS Ltd., Burlington, Ontario (CA)

( * ) Notice: Subject to any disclaimer, the term of this patent is extended or adjusted under 35 U.S.C. 154(b) by 2161 days.

(21) Appl. No.: 10/543,853

(22) PCT Filed: Jan. 30, 2004

(86) PCT No.: PCT/CA2004/000136
§ 371 (c)(1),
(2), (4) Date: May 24, 2006

(87) PCT Pub. No.: WO2004/067232
PCT Pub. Date: Aug. 12, 2004

(65) Prior Publication Data
US 2007/0005179 A1 Jan. 4, 2007

Related U.S. Application Data

(60) Provisional application No. 60/443,839, filed on Jan. 31, 2003.

(51) Int. Cl.
*B25J 9/16* (2006.01)
*G06Q 10/04* (2012.01)

(52) U.S. Cl.
CPC ............. *B25J 9/163* (2013.01); *B25J 9/1666* (2013.01); *G06Q 10/047* (2013.01)

(58) Field of Classification Search
CPC ........ B25J 9/163; B25J 9/1666; G06Q 10/047
(Continued)

(56) References Cited

U.S. PATENT DOCUMENTS 4,150,329 A * 4/1979 Dahlstrom .................... 318/574
4,538,233 A * 8/1985 Resnick et al. ............... 700/252
(Continued)

FOREIGN PATENT DOCUMENTS

EP 0 775 557 2/1994 ............... B25J 9/22

OTHER PUBLICATIONS

"Collision Free Minimum Time Trajectory Planning for Manipulators Using Global Search and Gradient Method" by Motoji Yamamoto, Yukihiro Isshiki and Akira Mohri, Department of Intelligent Machinery and Systems, Faculty of Engineering, Kyushu University, Hakozaki, Higashi-ku, Fukuoka 812 Japan.
(Continued)

*Primary Examiner* — Bao Long T Nguyen
(74) *Attorney, Agent, or Firm* — Baker & Hostetler LLP (57) ABSTRACT

A method and system for planning and optimizing the movement of a robotic device comprises establishing a plurality of spatial locations where the device can possibly be positioned and establishing rule sets for constraining movement of the robotic device between the locations. Once a start and end point have been determined, the method of the invention calculates all possible routes for the device to move, via the established locations and following the constraints of the rule sets. The calculated routes are then compared to a criteria, such as minimizing time, and an optimum route, meeting the desired criteria is determined. The calculated routes may also be cached for future access. The invention also provides for an error recovery method for allowing a robotic device to recover should it encounter an error.

27 Claims, 9 Drawing Sheets

(58) Field of Classification Search
USPC .......... 700/245, 213, 246, 249; 701/23, 117,
701/118, 119, 213, 214, 215, 221, 208,
701/226, 301; 340/995.1, 539.13, 539.17,
340/903, 905, 995.13; 342/357.03,
342/357.08, 357.1, 357.06, 357.13,
342/357.14, 457; 382/128, 224, 154,
382/285; 180/167
See application file for complete search history.

(56) References Cited

U.S. PATENT DOCUMENTS

| | | | |
|---|---|---|---|
| 4,675,502 A * | 6/1987 | Haefner et al. .......... | 219/124.34 |
| 4,744,719 A * | 5/1988 | Asano et al. ................ | 414/730 |
| 4,940,925 A * | 7/1990 | Wand et al. ................ | 318/587 |
| 5,491,638 A | 2/1996 | Georgi et al. ............ | 364/474.37 |
| 5,544,282 A | 8/1996 | Chen et al. .................... | 395/90 |
| 6,216,058 B1 * | 4/2001 | Hosek et al. ................ | 700/245 |
| 6,493,607 B1 * | 12/2002 | Bourne et al. ................ | 700/255 |
| 6,604,005 B1 * | 8/2003 | Dorst et al. .................... | 700/56 |
| 2003/0182052 A1 * | 9/2003 | DeLorme et al. ............ | 701/201 |

OTHER PUBLICATIONS

Lauria et al.; "Converting Natural Language Route Instructions into Robot Executable Procedures"; IEEE Int'l Workshop on Robot and Human Interactive Communication; Sep. 2002; 6 pages.

* cited by examiner

SYNTACTIC INFERENTIAL MOTION PLANNING METHOD FOR ROBOTIC SYSTEMS

CROSS REFERENCE TO PRIOR APPLICATIONS

This application is a National Stage of International patent application No. PCT/CA04/00136, filed on Jan. 30, 2004, that claims priority to U.S. Provisional patent application No. 60/443,839, filed on Jan. 31, 2003.

BACKGROUND OF THE INVENTION

1) Field of the Invention

The present invention relates to operational planning systems for robotic devices and particularly to methods of controlling and optimizing the movement of such devices using syntax based algorithms. The invention also provides an error recovery method for robotic devices.

2) Description of the Prior Art

Robots are exceedingly adept at moving in straight lines between precisely specified points. In real applications, however, motion is seldom so straightforward. Typical applications require the end effector of the robot to move through a series of programmed points to reach a pick-up point, grasp a payload at the pick-up point, then move through another series of points to a drop-off point, etc.

In the sequence of movements executed by the robot's effector, care must be taken to avoid, inter alia, the following "errors":

the end effector and/or payload hitting an obstacle during the motion sequence.

another moving object striking the robot or payload.

the robot moving through a singularity, or from ending up in an incorrect stance because of singularities.

the robot entering an invalid geometry that would, for example, spill the contents of the payload or cause some other unwanted effect.

As known in the art, an "inverse kinematic" solution for a robotic device (such as, for example a robotic arm as known in the art, having a number of degrees of freedom) refers to the manner in which the device moves itself to a given location in space. A singularity is a location of a robotic device where an infinite number of inverse kinematic solutions are possible. That is, a position where the device can place itself in an infinite number of combinations of its degrees of freedom. Due to such infinite number of possibilities, upon encountering a singularity, the result would be unexpected and unsafe movement of the device, which should be avoided.

Thus, a "planning" system is needed to guide the movement of the robot. Planning systems or methods for dealing with the above requirements—i.e. preventing collisions, avoiding singularities and preserving orientation—range from simple and inflexible code to extremely complex algorithms. One of the most simple approaches is to generate the sequences in hand-coded scripts. Although coded scripts specific to a particular application are relatively simple to design, they also have the disadvantage of being inflexible in behaviour or not adaptable to any change to the particular systems they are designed for. In such systems, motions tend to follow very "formal" patterns because any "shortcuts" between distant points must be explicitly coded on a per-case basis. It is, therefore, difficult to have such a system take advantage of fortuitous geometry where applicable.

A more complex approach is to model the entire workspace, including the robot and payload, geometrically. This type of motion planner would then lay out the robot motion according to actual geometric constraints. This method has the potential to yield the very best performance, but has at least three major problems. First, the workspace, robot and payload must be modeled very accurately and any errors in the model may lead to collisions. Second, the computational complexity of this approach is enormous and places high demands on the computational processor and requires a large memory capacity. Lastly, there may be other considerations restricting movement of the robot such as, for example, avoiding an open flame, that may be very difficult to model.

Various planning algorithms have been proposed in the prior art. Examples of such methods are described in U.S. Pat. Nos. 6,493,607 and 5,513,299. In both cases, the proposed methods involve complex modelling of the geometries included in the system.

Thus, a need exists for a simplified robotic planning system or method that is adjustable to changes in the environment it is used in and one that is easy to implement.

SUMMARY OF THE INVENTION

In one embodiment, the invention provides a method of planning motion of a robot from a start location to an end location, the start and end locations being within the range of motion of the robot, the method comprising:

a) defining at least two locations in terms of a spatial coordinate system, the at least two locations including the start and end locations;

b) storing the at least two locations in a computer memory;

c) defining a set of rules for governing movement of the robot between the at least two locations;

d) storing the set of rules in the computer memory;

e) calculating possible routes, through the at least two locations, from the start location to the end location; and, f) determining from the possible routes an optimized route which meets a predetermined criteria.

In another aspect of the method of the invention, the rules comprise at least one path and/or at least one region, the path comprising two or more of the at least two locations arranged in a preset order and wherein movement of the robot between locations on the paths is constrained to the preset order, and the region comprising two or more of the at least two locations arranged in a grouping and wherein the robot is permitted to move freely between any locations within the grouping.

In another aspect of the invention, step (f) comprises the sub-steps of:

i) finding all minimum-length routes that take the robot from the start location to the end location; and, ii) choosing from the minimum-length routes of step (i), the route having the shortest travel time from the start location to end location.

In another aspect, the invention provides for previously determined paths between two locations to be cached and accessed later if an optimized path between the same two locations is desired later.

In another aspect, the method of the invention includes an error recovery algorithm comprising the steps of:

a) choosing a minimum distance limit;

b) calculating the distance of the robot from each of the at least two locations;

c) identifying the nearest location to the robot, the nearest location having the shortest distance from the robot;

d) comparing the shortest distance to the distance limit; and e) where the shortest distance is less than or equal to the distance limit, assigning the robot to the nearest location.

In a further embodiment of the error recovery algorithm, where the shortest distance of step (e) is more than the distance limit, the method further comprises the steps of:

f) assigning a weighting factor, M, to each path and region;

g) calculating the shortest distance, D, from the robot to each line joining the at least two locations in the paths and regions;

h) dividing the shortest distances by the weighting factor to provide weighted distances, D/M;

i) identifying the line segment with the smallest weighted distance D/M;

j) comparing the smallest weighted distance, D/M, of step (i) with the minimum distance limit;

k) if the weighted distance for the identified line segment is less than the minimum distance limit, assigning the robot to the identified line segment;

l) calculating the distance of the robot to the end points of the identified line segment;

m) moving the robot to the closest of the end points and assigning the robot to the location occupied by the closest of the end points.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Definitions

The following terms are used in the present description and will be assumed to have the following meanings:

"Robot end effector", "robot", "robotic device", "mover": are used to refer to the moving end of a robotic device that perform the desired function. This can include, for example, the grasping end of a robotic arm. The assignee of the present invention, Thermo CRS Ltd., manufactures several types of such movers and examples are provided at www.thermo.com (the contents of which are incorporated herein by reference).

"Terminal points": refers to the points, or locations, where the robot end effector a actually interacts with objects. For example, in cases, as described further below, where a robotic arm is used to move an object from a conveyor belt to a nest in a carousel used to house the objects, the terminal points would consist of "belt" and "nest".

"Safe points": refers to pseudo-destinations where the robot end effector can be safely positioned out of the way, in proximity to a piece of equipment or an instrument, to await, for example, further instructions. Further description of this term is provided below with respect to specific examples of the invention.

"Location" or "Points": refers to a position that a robot end effector, or mover, can move to or through. A location is a position in space or the set of positions of a mover's motors or joints. Various known coordinate systems can be used to define a location. Examples of such systems include: joint (measured in degrees for rotational axes and millimeters for linear axes); motor (consisting of values in encoder pulses); Cartesian (consisting of values in degrees for rotation about the x, y, z axes and in millimeters for travel along the x, y, z axes); and cylindrical, which consists of values in degrees for yaw, pitch, roll and rotation about the z axis, and values in millimeters for travel along the z axis and the radial axis. For example, a particular location of a mover in joint coordinates can be represented as:

elevator=260 mm
shoulder=45 degrees
elbow=90 degrees
wrist=45 degrees

"Speed": defines a velocity and acceleration to use when moving between locations. This term refers to a pairing of velocity and acceleration and is a parameter used when moving the robot between locations. "Speed" is defined with low velocity values for motion in constrained spaces, such as those in and near nests (as described further below), and high velocity values for motion in open spaces, such as those between instruments and a conveyor belt. Acceleration values are used to control how smoothly the mover moves a container. Lower acceleration values produce smoother motion, but at the cost of longer move durations. An example of a speed parameter is as follows:

lowSpeed: speed
velocity=20%
acceleration=100%

"Interpolations": define a pattern from which the controller implementing the present method can automatically derive locations from ones that are manually defined. Interpolations can save time when teaching a mover to serve a multi-nest instrument.

"Path": defines a set of locations the mover may traverse only in a specific order. A path is an ordered set of points that may be traversed in either forward order or reverse order by the robot. In practice, if there are N points in the path, then we may specify N−1 sets of motion settings (speed, acceleration, etc.). These N−1 sets of settings define the speed, acceleration, etc., that the robot is to use for the corresponding segment of the path.

"Region": defines a set of locations the mover can safely traverse in any order. A region is an unordered set of points between which the robot may move freely. In practice, it is possible to define a set of motion settings (speed, acceleration, etc.) that the robot should use when executing a move between a pair of points in this region.

"Section": refers to a set of locations, paths, regions, interpolations, and speeds used to serve one instrument. If a mover can serve multiple instruments, its motion database typically has multiple sections.

In one aspect, the invention solves the problem of finding valid sequences of points for a robot to traverse in travelling between two points so as to avoid collision, singularities and spills etc. In one embodiment, the invention also provides an optimization algorithm for choosing the sequence(s) based on a particular criteria, for example, minimizing the travel time of the robot.

The present invention provides a Syntactic Inferential Motion Planning (SIMPL) methodology, which requires neither hand coding of scripts nor complete geometric modeling. The SIMPL algorithm can produce much better motion plans than fixed scripting, can take advantage of fortuitous geometry and requires only minimal processing power.

The invention, therefore, provides a method for automatically planning arbitrary move sequences between programmed points. The method requires only a set of programmed points (as is typically required in robot applications), and a set of simple syntactic rules, which constrain the solution to valid sequences, i.e., sequences of points that are collision, spill and singularity free. The method then plans moves by applying the specified syntactic rules in an inferential manner. In a further embodiment, the invention provides an error recovery algorithm for situations where an error, or other unexpected condition occurs.

The present invention has two broad aspects: 1) a notation or abstraction method for representing a set of rules for finding valid paths; and, 2) a method for finding an optimized valid path. The abstraction enables the applications of simple techniques to solve an otherwise very complex problem. Preferably, the invention also includes a third aspect: 3) an error recovery method for causing the robotic device to recover from error conditions.

This method of the invention is based on the premise that valid motions sequences (for example "nest→nest.transit→nest.safe→belt.safe→belt.transit→belt", which terms are defined further below) constitute valid sentences of a language (in the Computer Science sense of the word "language"). Given this premise, the motion planning problem decomposes into the following three parts (which were also referred to above):

1. Syntactic Representation:

which is how the language governing motion is represented. Once the "words" associated with specific positions of a robotic device are defined, motion of the device can then be reduced to a "sentence" of these "words", once arranged in a proper syntax. This step uses language specification techniques are known in compiler theory. The motion between two points can often be described in various valid sentences. As described further below, a "valid" sentence is one where the motion of the robotic device does not violate any of the unwanted effects such as collision with an object, singularities etc.

2. Inferential Planning and Optimization:

Which comprises finding the "best" valid sentence of the language that connects the desired start and end points. This is related to the inference and solution space search techniques commonly used in the field of artificial intelligence.

3. N-Dimensional Capsule Geometric Searching:

One implication of planning syntactically is that the mover must know the name of where it is in order to plan motions. In error conditions (e.g. after a collision) this search strategy handles getting the mover back to a known position.

The present invention will now be described in reference to a particular example, namely, a mover, or robotic arm, that is particularly suited for laboratory applications. The example relates to a Vertical Array Loader, or VAL, which is used to move objects between a conveyor and a vertical array holder or carousel. In one example, the objects comprise microtitre plates as known in the art. A typical VAL is depicted, for example, in FIGS. 3 to 7. The carousel typically has a number of "nests" for receiving the objects.

In the nomenclature, or naming convention, used in the present invention, locations are identified as either the terminal point (i.e. "nest" or "belt") and the associated "safe" point (i.e. nest.safe or belt.safe). Locations can also be indicated as a position of the mover when in transit between these locations as nest.transit or belt.transit. Transit locations are optional depending upon the system to which the method is being applied. It will be understood that any other type of nomenclature can be used with the present invention. These locations are described further below.

The "nest" location is where the mover grasps or releases an object, such as a container, in an instrument nest. The "nest.safe" location is where such instrument-specific actions as closing nest access doors can occur without colliding with the mover and where the mover can safely move to other safe locations. Typically, each nest in the instrument will have one nest location and one nest.safe location. In the preferred nomenclature of the invention, a two nest system will have the following locations: nest[1], nest[1].safe, nest[2], nest[2].safe. It will be understood that this nomenclature will extend to any number of nests. Typically, the nest numbering will start at 1 and not 0.

The "nest.transit" locations are optional, intermediate locations to make mover motion more flexible. For example, to access a nest in a vertical array of nests, it is typically needed to add at least one location between the "nest" and "nest.safe" locations to enable the mover to lower a container (or other object) into or raise a container from the nest.

The "belt" location is where a mover grasps or releases a container on a conveyor belt.

The "belt.safe" location corresponds to locations where the mover does not interfere with the movement of the conveyor.

The "belt.transit" locations are also optional, intermediate locations that allow for motion between the "belt" and the "belt.safe" locations more flexible.

It will be understood that the various locations described above will all be defined according to a coordinate system and that the locations will be established based on the geometries of the various components of the system.

Figure 1:
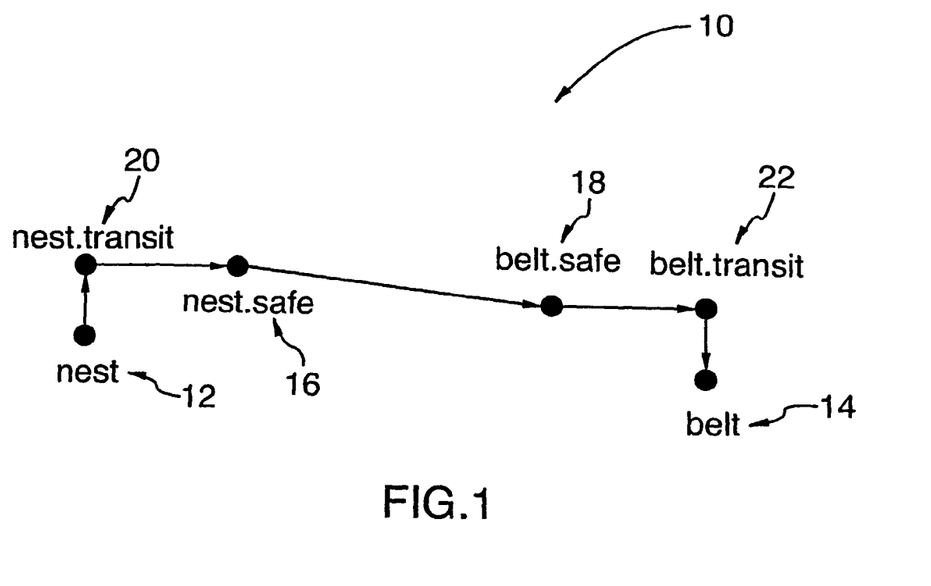
FIG. 1 is schematic representation of an example of a "path" between various location points traveled by a robotic device.

FIG. 1 depicts a simple motion sequence of a mover (i.e. VAL). As illustrated, the sequence 10 extends between a "nest" terminal point 12 and a "belt" terminal point 14. Other locations in the sequence of FIG. 1 include "safe" points, "nest.safe" 16 and "belt.safe" 18, and "transit" points, nest.transit 20 and belt.transit 22. The purpose of the "safe" and "transit" points ("nest.transit", "nest.safe", "belt.safe" and "belt.transit") is to identify locations of the mover so as to prevent one or more of the "errors" identified above (e.g. collision, singularities etc.)

The three aforementioned aspects of the invention will now be discussed in reference to the VAL mover described above. It will be understood that although the following discussion refers to a particular mover, the method of the invention would be applicable to various other robotic control systems as will be apparent to persons skilled in the art.

Phase 1: Syntactic Representation

Although there are a variety of techniques that would be suitable for representing a "grammar" for valid motions in the present invention, a preferred aspect utilizes a very straightforward approach wherein valid motion sentences are represented in terms of paths and regions. These terms were defined above but, briefly, if a mover is to move in a specific order, the respective locations are grouped into a "path". Alternatively, if the mover is to be able to move among a set of locations in any order, the locations are grouped into a "region".

Paths arise from the observation that a large part of a robot's motion consists of moving into or out of constrained spaces, like instrument nests in laboratory systems. The most natural way to represent these fixed segments is as a simple list. For example, the path P {nest, nest.transit, nest.safe} indicates that the robot may move from:

[nest→nest.transit→nest.safe]

or from:

[nest.safe→nest.transit→nest].

Regions arise from the observation that the robot frequently must move from the vicinity of one work area into the vicinity of another, and that this kind of movement tends to be through large areas of open space and to be relatively unconstrained. For example, the region R {nest.safe, belt.safe, reader.safe} allows the robot to move from:

[nest.safe→belt.safe],
[belt.safe→nest.safe],
[nest.safe→reader.safe],
[reader.safe→nest.safe],
[reader.safe→belt.safe] or
[belt.safe→reader.safe].

It should be noted that it is possible to represent paths as regions and regions as paths. A path of length N points or locations may be represented by N−1 regions of two points each. Likewise, a region of N points may be represented by a set of N(N−1)/2 paths of two points each. In fact, both paths and regions may, in the extreme, be represented as simple pairs of points. However, while it is possible to define paths and regions in terms of 2-tuples of points, this representation would not be preferred since it is neither computationally nor space (memory) efficient.

Thus, in the planning method of the present invention, the input information to the method consists of at least the following:

a) a set of programmed points, or locations, (as described above) consisting of both actual start and end points for robot motion, and various intermediate points and safe points for the robot to use when moving between start and end points. As indicated above, transit points are optional.

b) a set of paths and regions, which together constitute a set of rules, which valid motions (i.e. motions without collision, etc.) must obey. These rules may indicate various motion settings (i.e. speed, etc.) to be used when moving.

As will be understood by persons skilled in the art, the above mentioned rules, locations etc. will be stored in a memory device forming part of a control system for the mover. Such control systems are commonly known in the art. The present invention, therefore, comprises a method of operating the controller to perform the subject planning function.

Figure 2:
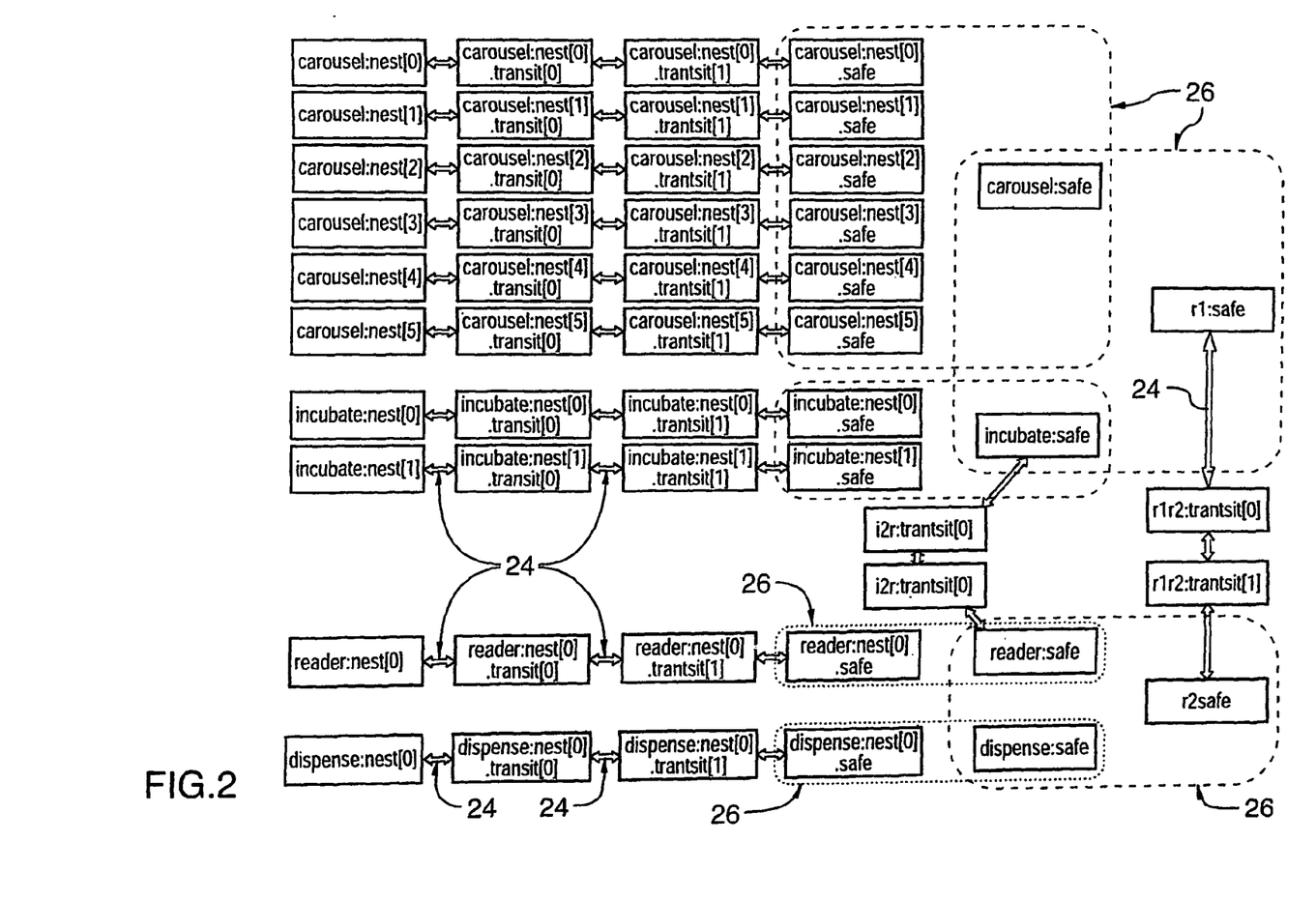
FIG. 2 is a schematic representation of a "path" map between various location points traveled by a robotic device in an example of a robotic system.

FIG. 2 shows a typical set of paths and regions for a small system. Paths 24 between points are depicted by two-headed arrows; regions 26 are depicted by circles of broken lines. It is noted that it is possible for one point to be a member of several paths and regions. It is noted in FIG. 2 that various types of "nests" are indicated, such as "carousel:nest", "incubate:nest", "dispense:nest" etc., and, more generally, "[instrument name]:nest". It will be understood by persons skilled in the art that this designation is used to identify nests in various equipment or instruments used in a given system and that any number of such equipment may be provided. It will also be understood that various types of equipment can be provided such as nesting devices, readers, belts (i.e. conveyors), incubators etc. The particular equipment will vary depending on the specific system. The present invention, however, is adaptable to any use and it is assumed that the necessary location designations will be apparent to persons skilled in the art.

With reference to FIG. 2, the following example route can be used in the depicted system for the mover to move from a start point of "carousel:nest[1]" to "incubate:nest[0]":

(start) carousel:nest[1]
→carousel:nest[1].transit[0]
→carousel:nest[1].transit[1]
→carousel:nest[1].safe
→carousel.safe
→incubate.safe
→incubate:nest[0].safe
→incubate:nest[0].transit[1]
→incubate:nest[0].transit[0]
(finish)→incubate:nest[0]

As shown in the above example, the movement from the start point to carousel:nest[1].safe followed a set path. However, at that point, the mover was able to move to the carousel.safe point and from there to the incubate.safe point since these points were in common regions. It will be appreciated that various other routes could have been taken in this example. Further, various "shortcuts" may be designed by "connecting" certain points together. For example, in the above scenario, the points carousel:nest[1].safe and incubate:nest[0].safe may be connected as a "shortcut" which would have enabled the mover to choose that route as well.

Figure 3:
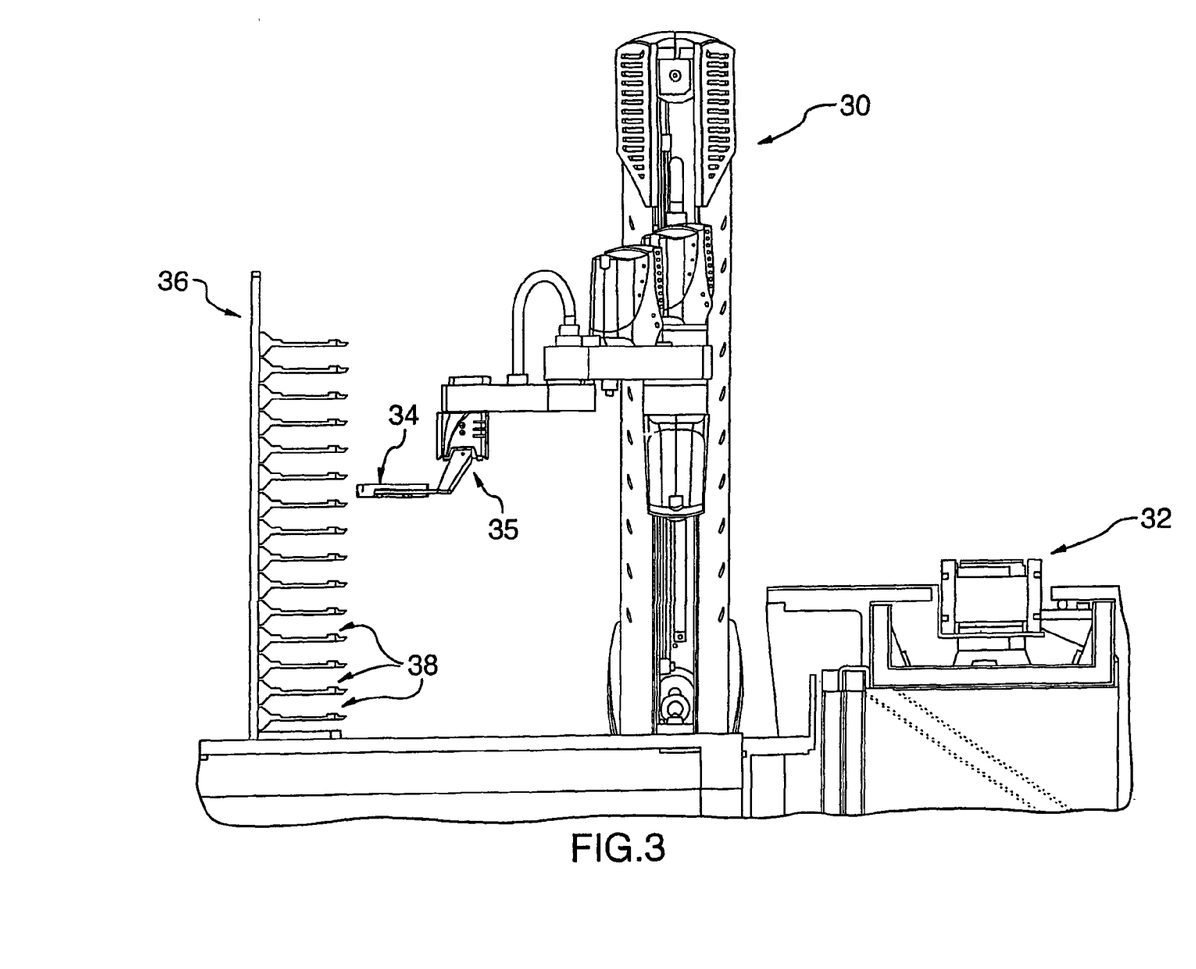
FIG. 3 is a side elevation of a robotic system for which the invention may be applied.

FIG. 3 illustrates a vertical array loader (VAL) 30 of the above example in position adjacent a conveyor belt 32, which is used to transport objects 34 such as sample containers or microtitre plates from one VAL to another. The effector end of the VAL 30 is shown at 35. The loader moves objects 34 between the belt 32 and a nesting apparatus 36, such as a microtitre plate "hotel", including one or more nests 38. Such nesting apparatus are commonly referred to as "hotels" or carousels. It will be understood that various support platforms etc. for the elements of the apparatus are not illustrated. Further, the above described controllers and associated motors etc. are also not illustrated and any commonly known devices can be used for this purpose.

Figure 4:
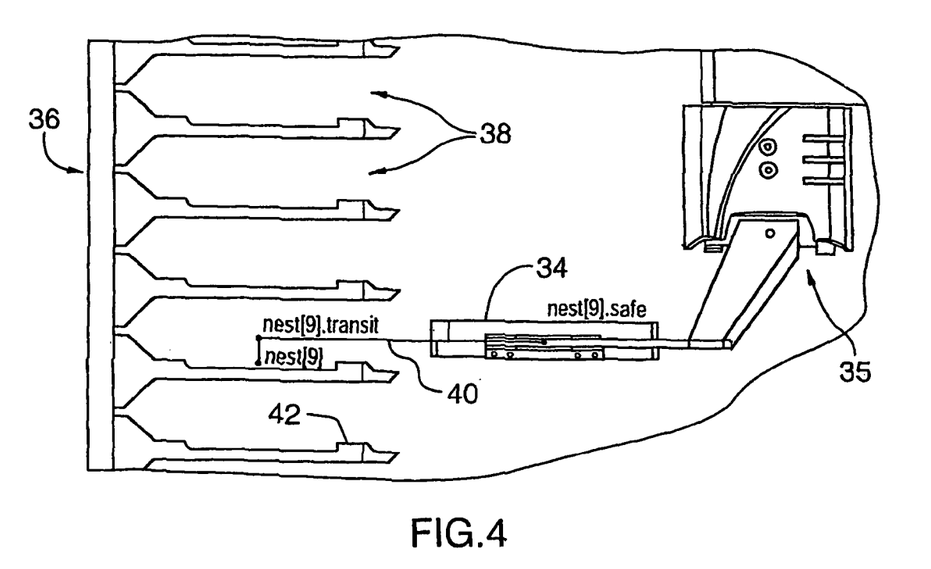
FIG. 4 illustrates a sample path of the system of FIG. 3.

FIG. 4 illustrates the arrangement of the nests in more detail. FIG. 4 also illustrates a sample path 40 according to the invention. Specifically, the path 40 in question comprises the following locations:

nest[9]→nest[9].transit→nest[9].safe

As can be seen in path 40, the nest.transit location, in this case, would be needed in order to enable the mover to lower a container into or raise a container from the nest. This is due to the inclusion of stops 42 that are normally provided on nests to positively position the respective objects therein. It will be understood that where the lifting of the objects above the stops 42 is not required, the path 40 can be amended to remove the transit location.

Figure 5:
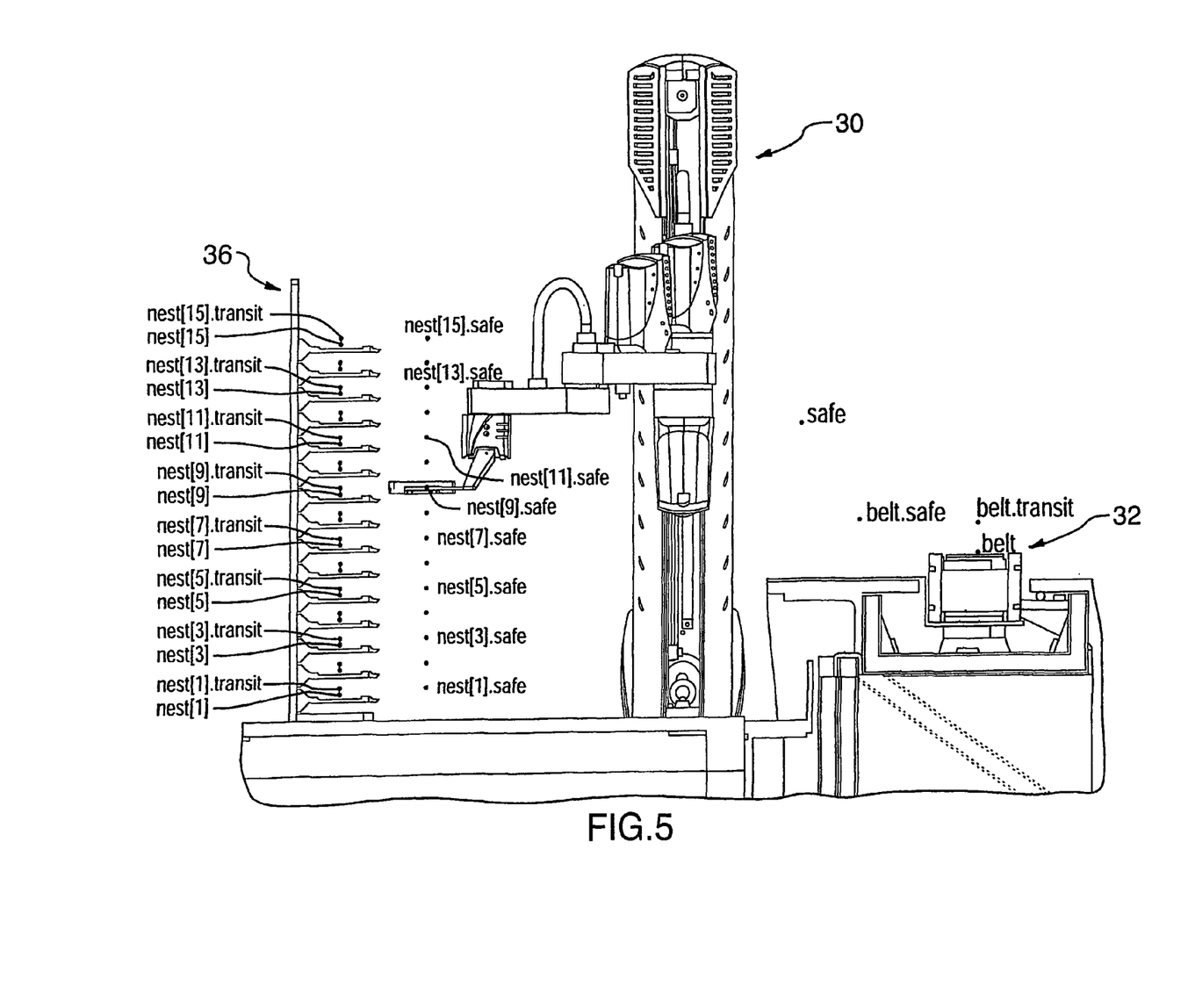
FIG. 5 illustrates various nest locations of the system of FIG. 3.

FIG. 5 schematically illustrates the VAL system of FIG. 3 but with various locations superimposed. The locations include, for example, nest[x], nest[x].transit, nest[x].safe etc., where "x" is an assigned identifier that is used to differentiate the nests (or other element of the system).

Figure 6:
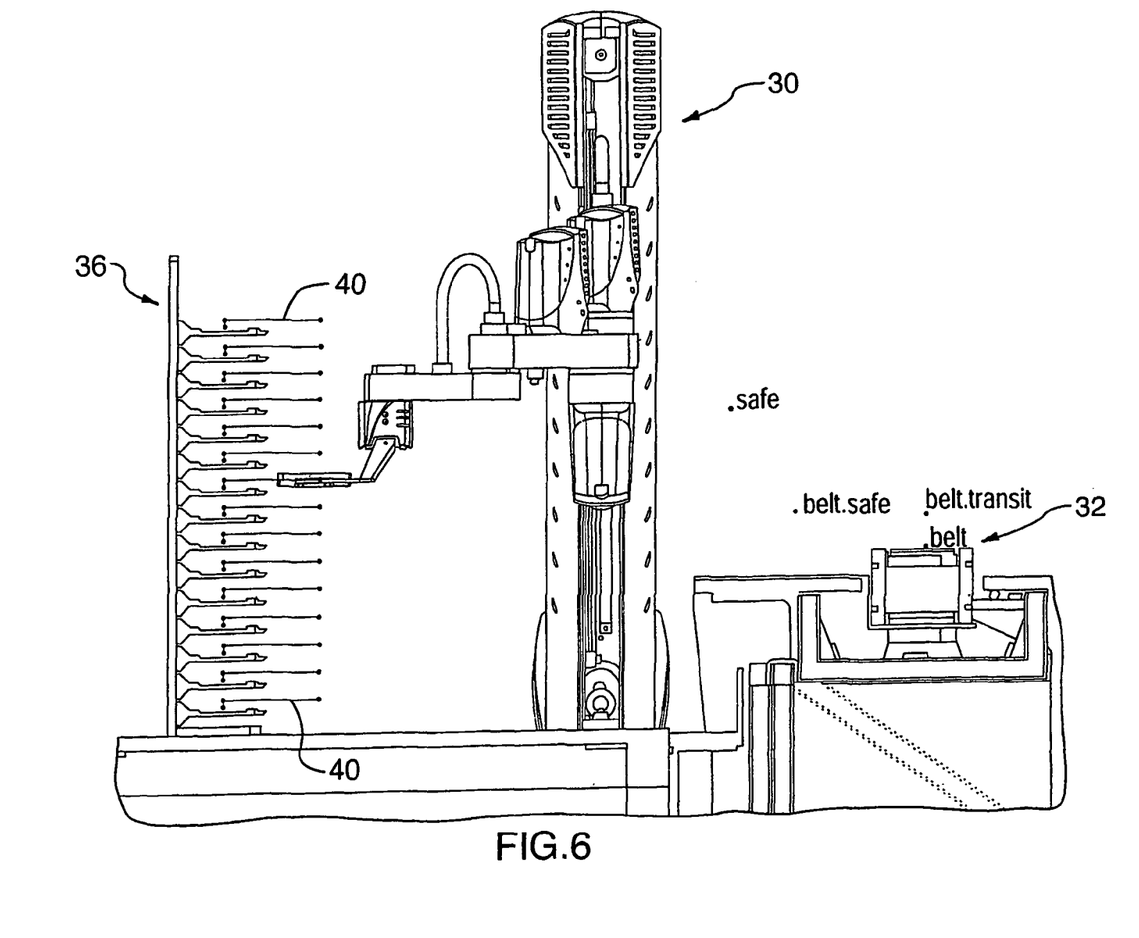
FIG. 6 illustrates paths between the nest locations of FIG. 5.

FIG. 6 schematically illustrates the VAL system of FIG. 5 but with paths, 40, depicted between respective nest locations. It will be understood that other paths will be defined for the system shown in FIG. 6 but such paths are not depicted for the sake of brevity.

Figure 7:
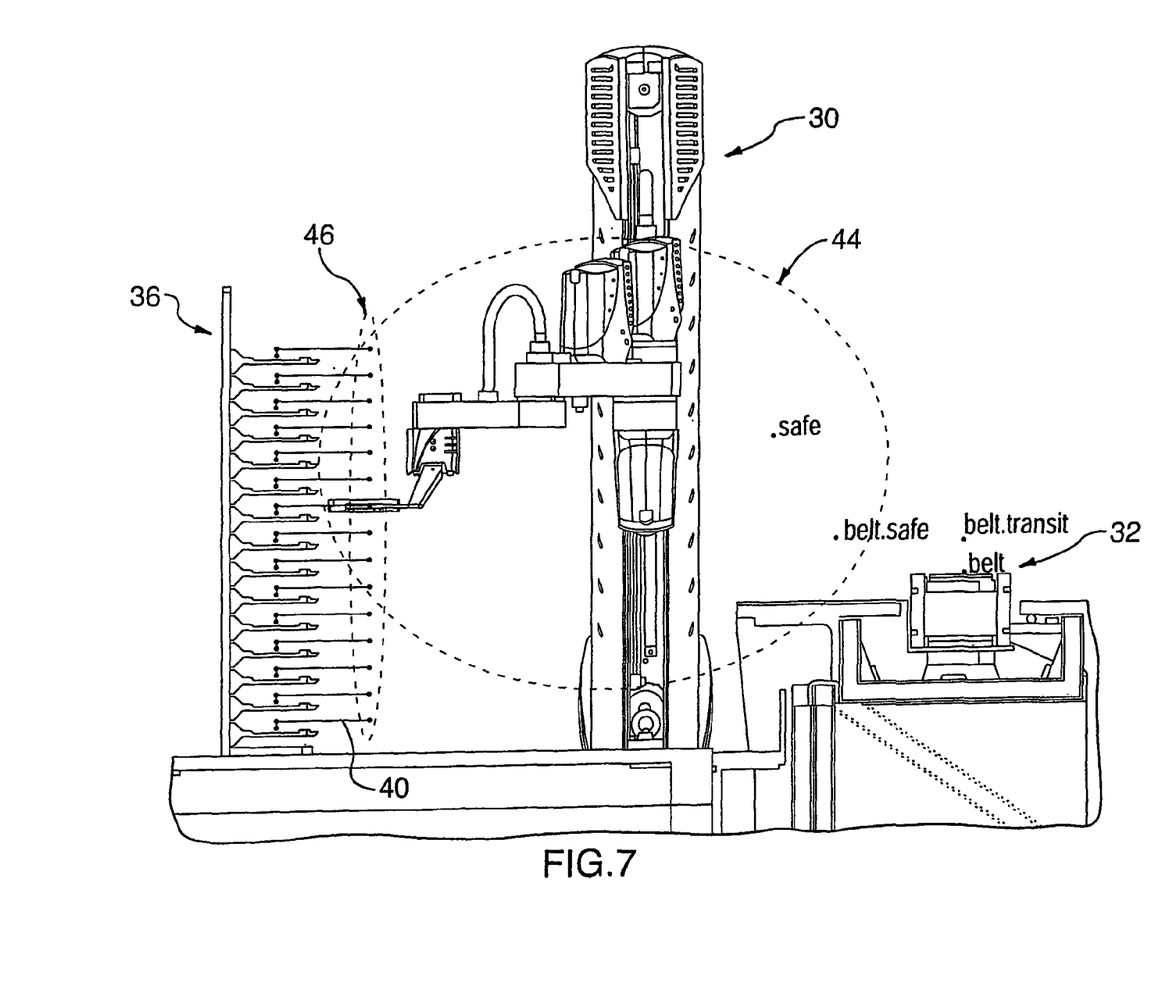
FIG. 7 illustrates regions between various locations of FIG. 5.

FIG. 7 illustrates the system of FIG. 6, including locations and nest-related paths, but is superimposed with a depiction of two sample "safe" regions, 44 and 46. For example, a first safe region 44 encompasses various "nest.safe" points as well as "safe" and "belt.safe" points. A second safe region 46 encompasses all "nest.safe" points. It will be understood that various other regions may be specified in the system depending on the particular limitations.

Phase 2: Inferential Planning and Optimization:

The second phase of the method involves the inferential planning and optimization processes. Firstly, after inputting the necessary data, specified in terms of points, paths and regions, the planning method requires a start point and an end point. The goal of the algorithm is to find an optimal (or near optimal) path from the start point to the end point (by way of 0 or more other programmed points), such that each point-to-point move obeys the rules specified by the paths and regions defined for the system. For the purposes of this discussion, the term "routings" will be used to refer to the set of all paths and regions.

The most basic form of the planning algorithm consists of two basic steps:
1. Find all minimum-length combinations of routings that take the robot from the start point, or location, to end point. It will be noted that there may be more than one set of routings that will serve to do this, but each combination will have the same number of routing steps.
2. Within the combinations of routings from step (1), find the shortest travel time path from start to end.

The result of step (2) provides the optimized solution. Step (1) is accomplished by means of a "fire" algorithm in which the start point is set on "fire" and the fire allowed to propagate at a rate of one step per iteration through all connected routings until the end point is reached. In a preferred embodiment, a reverse pass (from end to start) is then used to remove routings that are not part of any solution.

Step (2) is accomplished by starting at the end point and working backwards by all possible paths that use only the routings found in step (1). As the possible paths are computed, the algorithm tracks the estimated travel time (based on geometric or robot joint distance). This allows the algorithm to choose between possibilities at each step, and find the optimum path. This travel time information is then used to construct the optimized path from start to end.

It will be appreciated that the embodiment of the algorithm described above determines the "optimal" path from start to end based on the criteria of time. That is, the algorithm is designed to find the path having the shortest travel time within the set of possibilities having the smallest number of routing steps. It is, therefore, possible to artificially construct an example where the true optimal path, based on other criteria, which takes more routing steps, is not found. In practice, we have found that this case seldom occurs, and can be avoided through careful application of the above method.

It will also be appreciated that the order of complexity of the algorithm of the invention is $O(N!)$, where N is the number of routings. However, this is a worst-case complexity and only manifests when routings are very heavily interconnected. In typical applications, this issue is of little significance. For practical applications, the order of complexity is closer to $O(N^2)$, which is more manageable. For example, for planning motions for the system of FIG. 2, very little computing power would be required.

In a further embodiment, the method of the invention involves keeping a cache (or list) of recently planned motions. Before a new move sequence is planned, the cache is checked. If a previously computed sequence exists that contains the desired start and end points, then the relevant segment of the pre-computed sequence may be used, and no further calculations are required. It will be appreciated that this type of caching would increase the efficiency of the present invention. As each completely new move is computed, the cache is updated so that sequences that are contained within the new computed sequence (as a subset) are simply replaced. Otherwise, conventional cache management strategies (like Least Recently Used replacement) may be applied to managing the cache.

Phase 3: N-Dimensional Capsule Geometric Searching:

As indicated above, phase 3 of the method is an optional and preferred step. In order for the Syntactic Inferential Motion Planner to function, it is necessary that the algorithm know the name of the mover end effector's present location. This requirement is not difficult to fulfill under normal operating conditions. However, in emergency stop or collision conditions, the mover may be halted while in motion at a position which is not a known location. According to an embodiment of the present invention, a two-step approach is utilized to "finding" where the robot is and returning it to a known location.

Step 1: Location List Searching

This step is followed if the robot is not at a known location. First, for every known location, the distance between the robot end effector and each of the locations is calculated. If this distance is less than a configured match radius, which translates to a spherical volume, then the robot is simply considered to be at the location, and planning proceeds normally.

Figure 8:
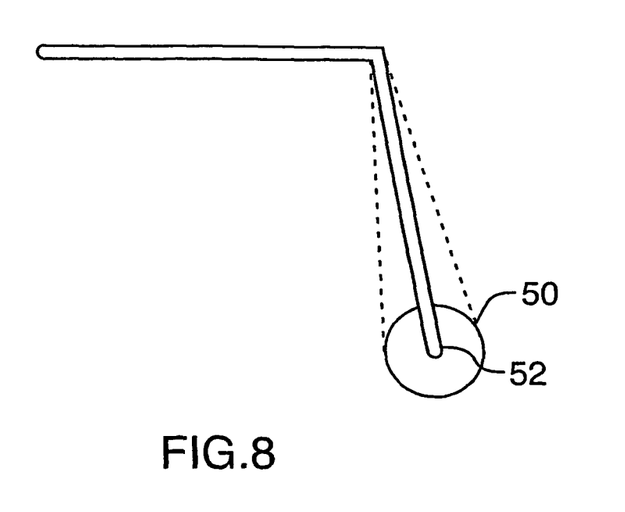
FIGS. 8 and 9 illustrate error capsule regions for a robotic device.

FIG. 8 illustrates a spherical match radius 50 area around the end effector 52 of a hypothetical two-joint robot. A point must lie within this sphere for the robot to be considered to be at that location. This match radius must be chosen carefully (i.e. it should not be too large), or, as will be apparent to persons skilled in the art, erroneous motion may result because of the robot's distance from the point. The appropriate size of the match radius will be apparent to persons skilled in the art based upon the specific system to which the method is applied.

Figure 9:
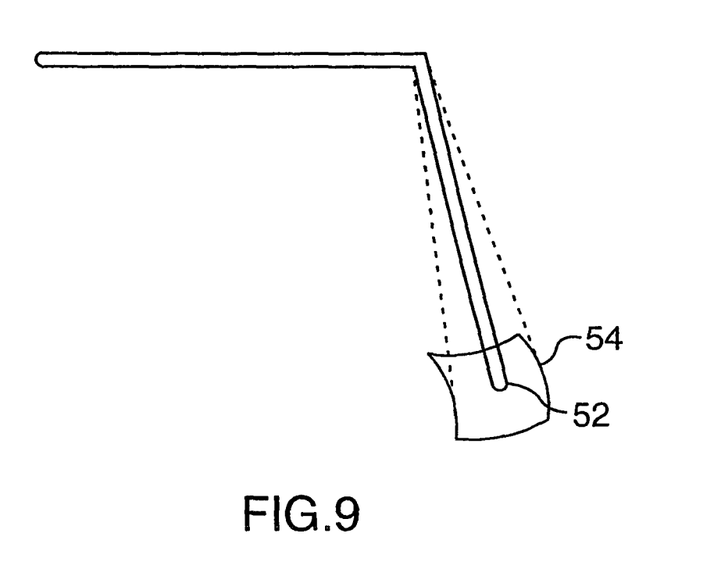

FIG. 9 illustrates an embodiment where distance measurement may not be based on Cartesian coordinates. In this case, a non-spherical shape 54 results from matching based on the joint angles of the robot instead of the Cartesian location. The advantage of using joint angles is that the number of calculations required to compute the distance is greatly reduced. In one preferred embodiment, this is the approach used to match locations. Essentially, the distance is calculated in an N-dimensional space, where N is the number of robot joints. In FIG. 9, a "city-block" distance measure is used. It is possible to also use a Euclidean or other reasonably behaved distance measure.

Step 2: Capsule Searching:

This step is followed if the location list search did not find a reasonable location for the robot end effector. In this step, a search is conducted using the paths and regions in the planner's input data.

As described above, paths and regions all consist of sets of line segments connecting pairs of points. A path of length N points specifies N−1 line segments; a region of N points specifies N (N−1) line segments. The user is permitted to assign a weighting factor or match radius multiplier M (>0) to each path and region a priori, for use during this error recovery step. Thus, each line segment would have a capsule-like area around it in which the end effector must lie in order to be considered to be on the line segment.

Upon encountering an error situation, to return the robot to a position from which it can proceed, the following steps are taken. First, for each line segment in each path and region, the closest distance D from the end effector position to the line segment is computed. Following this, a weighted distance, D/M, is calculated. The line segment with the smallest D/M value is then determined.

If the weighted distance, D/M, for this "best" line segment is less than the match radius, the robot end effector is determined to be at a position on the line segment. If a line segment fitting this criterion is not found, an error condition is generated and user intervention is requested.

Once a line segment that the mover is adjacent to is determined, the distance of the end effector to each of the two end points is computed, and the mover is commanded to move directly to the closest point at low speed. Since the end effector position would be close to the line segment, and since the line segment represents a valid trajectory that can be followed by the mover, no collision should result as a result of this repositioning of the mover. Once this low-speed move has been made, the mover is then at a known position, and planning may continue normally.

As discussed previously, the distance measure need not be Cartesian. In a preferred embodiment, a joint-angle based Euclidean distance is used to find the distance to each line segment.

It will be understood that the error recovery algorithm described above can be utilized independently of the optimization method discussed previously.

Strengths of this Approach

The above mentioned method to locating the robot during error conditions has two distinct strengths:

1. In one typical error scenario, the mover is in motion as the user operates the emergency stop switch. In this scenario, the robot stops very quickly. Since the robot was moving along a valid line segment when the switch was operated, it should tend to remain close to the line segment.
2. Extreme error conditions (like a collision) may be handled by setting up special "recovery paths" and associated "recovery spaces" with very large radius multipliers. For example, a path in an empty part of the mover workspace may be set up this way so that the user can easily move the end effector by hand to a position close enough to allow error recovery.

Figure 10:
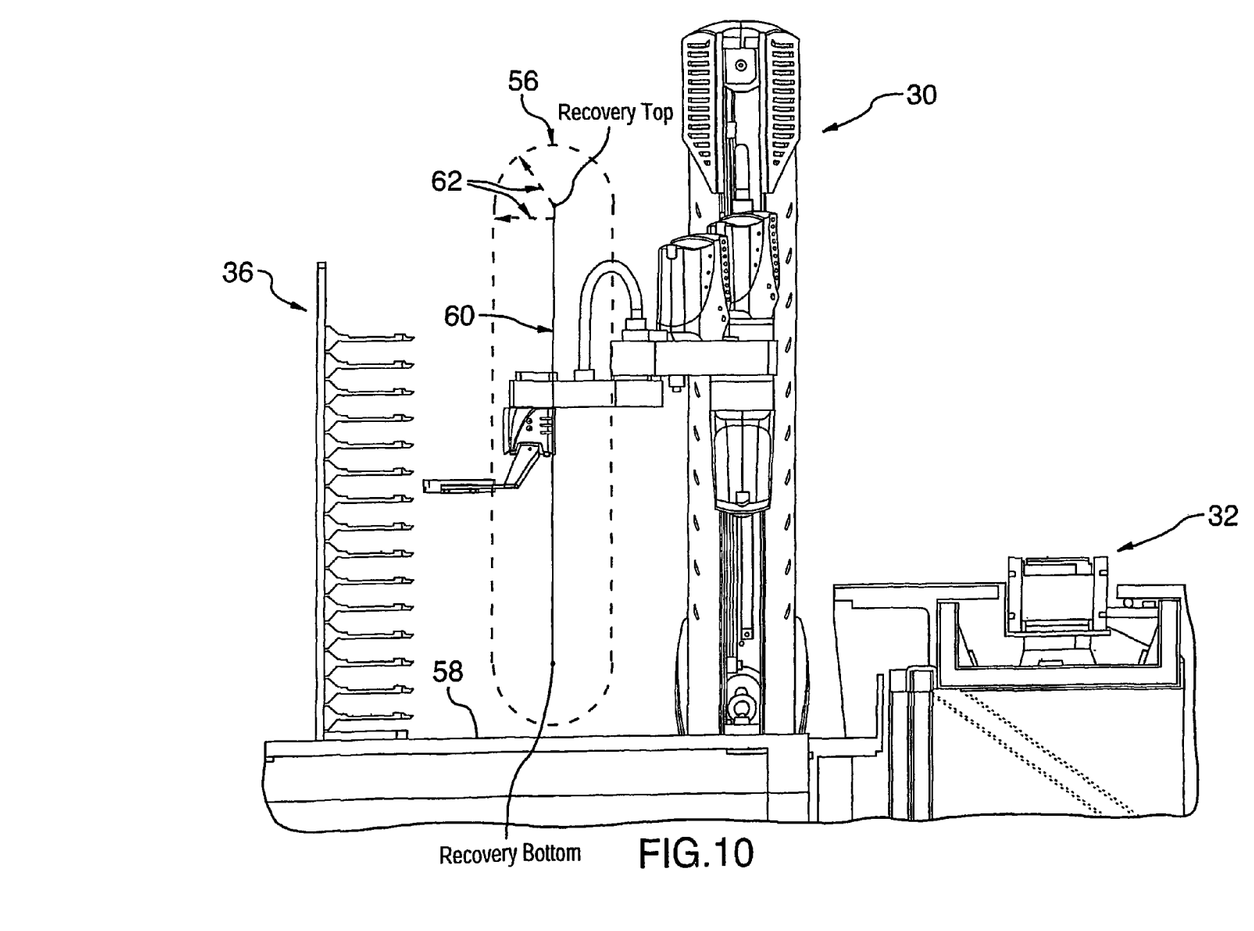
FIG. 10 illustrates an error recovery space for the system of FIG. 3.

FIG. 10 illustrates a "recovery space" with respect to the VAL example previously discussed. As shown, a sample recovery space 56 extends between the VAL 30 and the nesting apparatus 36 (e.g. microtitre plate hotel), extending from just above the table surface 58 to well above the nesting apparatus 36. The recovery space should be large enough that the operator does not have to be overly precise about positioning the VAL, but constrained enough that there is no risk of collisions when the VAL moves between the recovery space and any adjacent defined location. As shown, the recovery space 56 is calculated based on the desired recovery path 60 and the path radius 62. To define the recovery space 56 the recovery path 60, or region, is first defined, consisting of two locations: "recoveryTop" and "recoveryBottom". The recovery path (or region) 60 is then given a radius setting 62.

The present invention offers various advantages over methods known in the prior art. Firstly, the invention allows one to solve the complex problem of moving a robot in an optimal or near-optimal fashion from one point to another, without requiring either geometric modeling or large amounts of computing power. This enables robots to move in a more "natural", "graceful" manner, and allows the system to take advantage of fortuitous geometry without the user coding or specifying every possible path. The benefit of this is fourfold: (1) increased speed, because motions may be more direct and less "formal" in their form, and have less wasted motion; (2) simple system set-up and teaching, because the abstractions are not difficult to understand or use; (3) optimizable motion, as the user may provide "shortcuts" for the robot to take between points by simply adding more paths/regions into the rule list; and, (4) well-behaved and highly automated error recovery.

A further benefit of this method is that "smart move" commands may be implemented in robotic systems that allow the user to simply tell the robot where it should move to, without regard for intervening obstacles, etc. The motion planner can then use knowledge of the robot's current position and its destination position to move the robot in an optimized and safe fashion.

It will be appreciated by persons skilled in the art that the planning method of the present invention is particularly adapted for implementation into a computer based robot controller. It will be understood that the various locations or points, paths, regions, routings etc. described above will be first stored in a memory either implemented in or associated with the computer so that such data is accessible by the computer's processor for conducting the necessary calculations.

The invention has been described above with respect to certain specific examples for the purpose of convenience. It will be understood however that the method of the invention can be utilized in or with any number or types of systems.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for planning the motion of a robot, comprising:
   a) defining a plurality of robot end effector locations, in terms of a spatial coordinate system, including a start location, an end location, and at least one other programmed point;
   b) storing said locations in a computer memory;
   c) defining a set of rules for governing movement of said robot end effector between said locations;
   d) storing said set of rules in the computer memory;
   e) calculating, by a processor, two or more possible routes from said start location to said end location;

f) determining, by said processor, from said two or more possible routes, an optimized route, from said start location to said end location, which meets a predetermined criteria; and g) enabling, in response to said determination of said optimized route which meets the predetermined criteria, movement of said robot end effector along said optimized route from said start location to said end location by way of the at least one other programmed point such that each point-to-point move obeys the set of rules.

2. The method of claim 1 wherein said locations include at least one terminal location at which the robot end effector interacts with an object.

3. The method of claim 2 wherein said locations include safe positions of said robot end effector; and transit positions of said robot end effector.

4. The method of claim 1 wherein said locations include at least one safe location at which the robot end effector is safely positioned out of the way of a proximate piece of equipment.

5. The method of claim 4 wherein said locations include object engagement or release positions of said robot end effector; and transit positions of said robot end effector.

6. The method of claim 1 wherein said set of rules comprises conditions of movement of said robot end effector between adjacent pairs of said locations.

7. The method of claim 1 wherein, in step (e), all possible routes between said start and end locations are calculated, said routes comprising a sequence of locations.

8. The method of claim 1 wherein, in step (f), the predetermined criteria comprises a minimized travel time of said robot end effector between said start and end locations.

9. The method of claim 8 wherein said step (f) comprises the sub-steps of:
i) finding all minimum-length routes that take the robot end effector from the start location to the end location; and,
ii) choosing from said minimum-length routes of step (i), the route having the shortest travel time from said start location to end location.

10. The method of claim 1 wherein said rules comprise at least one path, said path comprising two or more of said locations arranged in a preset order and wherein movement of said robot end effector between locations on said paths is constrained to said preset order.

11. The method of claim 1 wherein said rules comprise at least one region, said region comprising two or more of said locations arranged in a grouping and wherein said robot end effector is permitted to move freely within said region.

12. The method of claim 1 wherein said rules comprise at least one path and at least one region, said path comprising two or more of said locations arranged in a preset order and wherein movement of said robot end effector between locations on said paths is constrained to said preset order, and said region comprising two or more of said locations arranged in a grouping and wherein said robot end effector is permitted to move freely within said region.

13. The method of claim 12 wherein, in step (e) of the method, all possible routes between said start and end locations are calculated, said routes comprising a sequence of locations.

14. The method of claim 13 wherein, in step (f), the predetermined criteria comprises a minimized travel time of said robot end effector between said start and end locations.

15. The method of claim 12, wherein said method includes an error resolving algorithm wherein the robot resolves location when an error condition is encountered.

16. The method of claim 15 wherein said error resolving algorithm results in the robot end effector being assigned to a nearest one of said locations.

17. The method of claim 16 wherein the robot end effector is assigned to the nearest one of said locations by the steps of:
choosing a minimum distance limit;
calculating the distance of said robot end effector from each of said locations;
identifying the nearest location to said robot end effector, said nearest location having the shortest distance from said robot end effector;
comparing said shortest distance to said distance limit; and
where said shortest distance is less than or equal to said distance limit, assigning the robot end effector to said nearest location.

18. The method of claim 17 wherein, where said shortest distance is more than said distance limit, the method further comprising the steps of:
assigning a weighting factor, M, to each path and region;
calculating the shortest distance, D, from the robot end effector to each line joining said locations in said paths and regions;
dividing said shortest distances by the weighting factor to provide weighted distances, D/M;
identifying the line segment with the smallest weighted distance D/M;
comparing the smallest weighted distance, D/M, with said minimum distance limit;
if the weighted distance for the identified line segment is less than the minimum distance limit, assigning the robot end effector to said identified line segment;
calculating the distance of the robot end effector to the end points of said identified line segment; and
moving said robot end effector to the closest of said end points and assigning the robot end effector to the location occupied by the closest of said end points.

19. The method of claim 15 wherein said error resolving algorithm comprises the steps of:
choosing a minimum distance limit;
assigning a weighting factor, M, to each path and region;
calculating the shortest distance, D, from the robot end effector to each line joining said locations in said paths and regions;
dividing said shortest distances by the weighting factor to provide weighted distances, D/M;
identifying the line segment with the smallest weighted distance D/M;
comparing the smallest weighted distance, D/M, with said minimum distance limit;
if the weighted distance for the identified line segment is less than the minimum distance limit, assigning the robot end effector to said identified line segment;
calculating the distance of the robot end effector to the end points of said identified line segment; and
moving said robot end effector to the closest of said end points and assigning the robot end effector to the location occupied by the closest of said end points.

20. The method of claim 12 wherein said step (f) comprises the sub-steps of:
i) finding all minimum-length routes that take the robot end effector from the start location to the end location; and ii) choosing from said minimum-length routes of step (a), the route having the shortest travel time from said start location to end location.

21. The method of claim 1, wherein said method includes an error resolving algorithm wherein the robot resolves location when an error condition is encountered.

22. The method of claim 21 wherein said error resolving algorithm results in the robot end effector being assigned to a nearest one of said locations.

23. The method of claim 22 wherein the robot end effector is assigned to the nearest one of said locations by the steps of:
choosing a minimum distance limit;
calculating the distance of said robot end effector from each of said locations;
identifying the nearest location to said robot end effector, said nearest location having the shortest distance from said robot end effector;
comparing said shortest distance to said distance limit; and
where said shortest distance is less than or equal to said distance limit, assigning the robot end effector to said nearest location.

24. The method according to claim 1 wherein optimized routes between pairs of locations are cached in the computer memory and made searchable.

25. The method of claim 24 wherein, upon entering a start location and an end location, the computer memory is searched for previously determined optimized paths.

26. The method of claim 1, wherein the spatial coordinate system is a joint coordinate system, a motor coordinate system, a Cartesian coordinate system or a cylindrical coordinate system.

27. A controller for a robot, the controller comprising a processor and a computer memory, wherein the processor is configured to:
define a plurality of robot end effector locations, in terms of a spatial coordinate system, including a start location, an end location, and at least one other programmed point;
store said locations in the computer memory;
define a set of rules for governing movement of said robot end effector between said locations;
store said set of rules in the computer memory;
calculate two or more possible routes from said start location to said end location;
determine from said two or more possible routes, an optimized route, from said start location to said end location, which meets a predetermined criteria; and
enable, in response to said determination of said optimized route which meets the predetermined criteria, movement of said robot end effector along said optimized route from said start location to said end location by way of the at least one other programmed point such that each point-to-point move obeys the set of rules.

* * * * *